(12) United States Patent
Christie et al.

(10) Patent No.: US 6,809,165 B2
(45) Date of Patent: Oct. 26, 2004

(54) METHOD FOR PRODUCING POLYMERS

(75) Inventors: David Christie, Mannheim (DE); Sylke Haremza, Neckargemuend (DE); Susanne Brinkmann-Rengel, Ober-Olm (DE); Roman Benedikt Raether, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 112 days.

(21) Appl. No.: 10/239,204

(22) PCT Filed: Apr. 3, 2001

(86) PCT No.: PCT/EP01/03787

§ 371 (c)(1),
(2), (4) Date: Sep. 27, 2002

(87) PCT Pub. No.: WO01/74908

PCT Pub. Date: Oct. 11, 2001

(65) Prior Publication Data

US 2003/0073793 A1 Apr. 17, 2003

(30) Foreign Application Priority Data

Apr. 4, 2000 (DE) .......................................... 100 16 651

(51) Int. Cl.⁷ ............................ C08F 2/38; C08F 293/00
(52) U.S. Cl. ...................... 526/222; 526/193; 526/194; 526/204; 526/205; 526/220; 526/224; 525/256; 525/261
(58) Field of Search ................................. 525/256, 261; 526/204, 205, 220, 224, 193, 194, 222

(56) References Cited

U.S. PATENT DOCUMENTS

| 5,322,912 A | | 6/1994 | Georges et al. |
| 5,412,047 A | | 5/1995 | Georges et al. |
| 5,455,321 A | * | 10/1995 | Cummings et al. ...... 526/232.3 |
| 5,627,250 A | * | 5/1997 | Tsuji et al. ................. 526/338 |
| 6,353,066 B1 | * | 3/2002 | Sosa ........................... 526/224 |
| 6,391,983 B1 | * | 5/2002 | Bateman et al. ............ 525/529 |

FOREIGN PATENT DOCUMENTS

| EP | 0 135 280 | 3/1985 |
| EP | 0 735 052 | 10/1996 |
| GB | 1 124 009 | 8/1968 |
| WO | WO 94/11412 | 5/1994 |
| WO | WO 96/18663 | 6/1996 |
| WO | WO 00/63267 | 10/2000 |

* cited by examiner

Primary Examiner—Fred Teskin
(74) Attorney, Agent, or Firm—Oblon, Spivak, McClelland, Maier & Neustadt, P.C.

(57) ABSTRACT

A process for the preparation of polymers is described, wherein at least one first ethylenically unsaturated monomer is subjected to a free radical polymerization in the presence of stable free radicals or sources of stable free radicals and of a compound having at least one free thiol group to give a polymer, and wherein the molar ratio of compound having a free thiol group to stable free radicals is from 0.05 to 1.1. The polymerization rate is substantially increased by the compound having a free thiol group.

12 Claims, 1 Drawing Sheet

METHOD FOR PRODUCING POLYMERS

Figure 1:
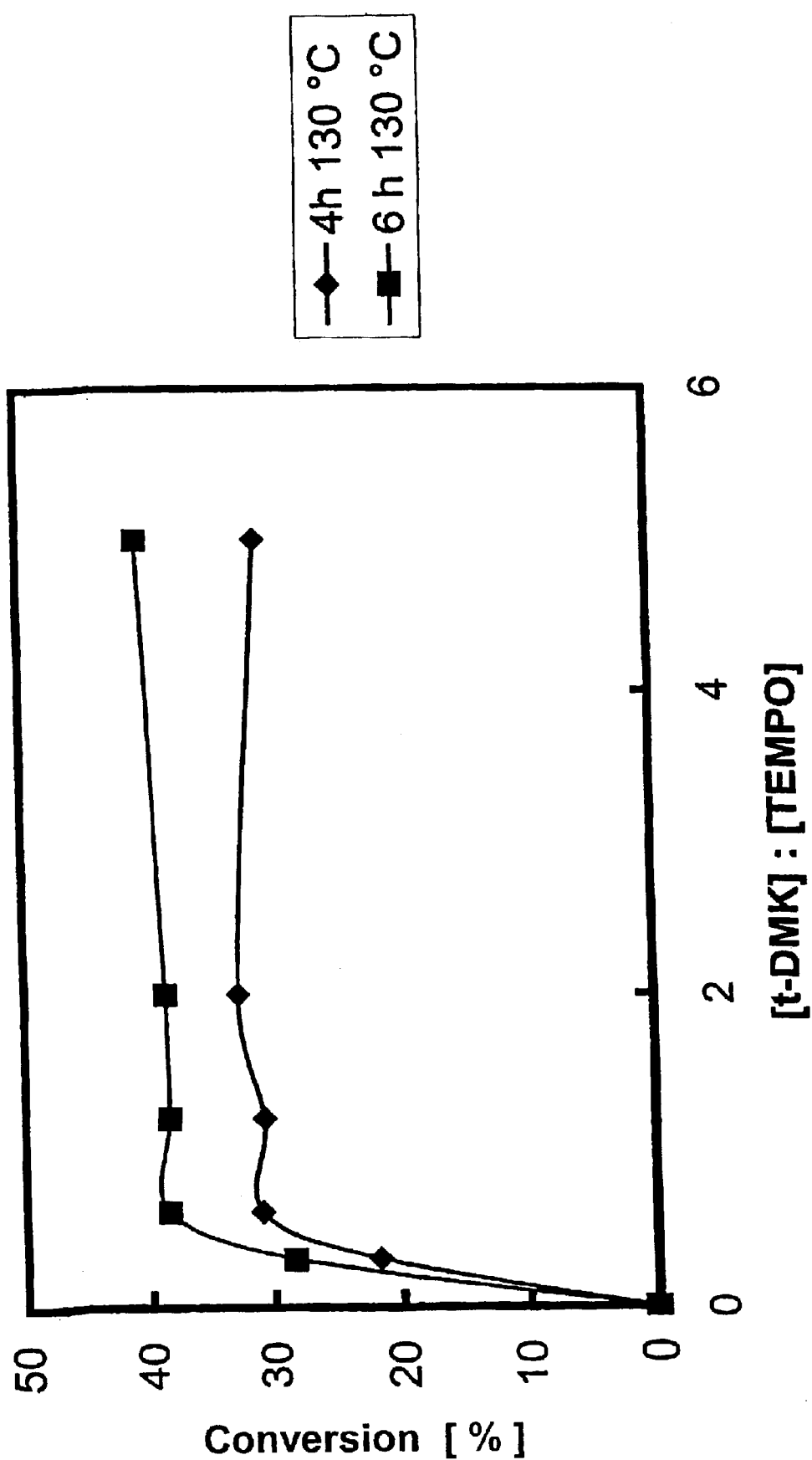

The present invention relates to a process for the preparation of polymers having a narrow molecular weight distribution and a polymer prepared by the process.

Usually, polymers prepared by free radical polymerization of ethylenically unsaturated monomers have the disadvantage that the molecular weight of the polymer chains increases nonlinearly with the polymerization conversion and the polymer chains of the resulting polymer do not have a uniform molecular weight. The polymer obtainable by free radical polymerization therefore usually has a high polydispersity index PDI (PDI=$M_w/M_n$, where $M_w$ is the weight average molecular weight of the polymer and $M_n$ is the number average molecular weight of the polymer. This is due on the one hand to the half-lives of the free radical initiators, which may be from a few minutes to several hours. Consequently, the growth does not begin at the same time for all polymer chains, and it is for this reason that chains having different chain lengths form during the reaction. On the other hand, the growing polymer chains react with one another with combination or disproportionation, which leads to termination of chain growth. Since such termination reactions occur during the entire reaction time, this too leads to different chain lengths in the polymer.

In order to obtain polymers having a narrow molecular weight distribution, the growth of the chain should begin as far as possible at the same time for all polymer molecules and chain termination reactions should be suppressed.

WO 94/11412 describes a polymerization process for the preparation of a thermoplastic resin, a mixture of free radical initiator, a stable free radical and at least one polymerizable monomer being heated. Polymers having a narrow polydispersity are obtained. TEMPO (2,2,6,6-tetramethyl-1-piperidinyloxy) and PROXY (2,2,5,5-tetramethyl-1-pyrrolidinyloxy) and derivatives thereof are proposed as stable free radical.

Further processes for the control of free radical polymerization, i.e. for the free radical polymerization in the presence of stable free radicals, are described in EP-A-0 735 052, U.S. Pat. No. 5,322,912, U.S. Pat. No. 5,412,047 and GB 1,124,009.

However, the processes described in said publications have the disadvantage that the polymerization takes place only very slowly and with unsatisfactory conversion in the presence of the stable free radicals.

EP-A-0 735 052 describes a polymerization process for the preparation of thermoplastic resins, in which specific sulfonic acid salts are concomitantly used for increasing the polymerization rate of the controlled free radical polymerization. 2-Fluoro-1-methylpyridinium p-toluenesulfonate is particularly preferably used. The sulfonic acid salts described are however not directly available and, owing to their fluorine content, are undesired in certain applications.

It is an object of the present invention to provide an alternative process for the preparation of polymers having a narrow molecular weight distribution, which process permits a higher reaction rate and higher conversions compared with known controlled free radical polymerizations.

We have found that this object is achieved by a process for the preparation of polymers, wherein at least one ethylenically unsaturated monomer is subjected to a free radical polymerization in the presence of stable free radicals or sources of free radicals and of a compound having at least one free thiol group to give a polymer, and wherein the molar ratio of compound having free thiol group to stable free radicals is from 0.05 to 1.1.

Surprisingly, it has been found that a substantial increase in the polymerization rate can be achieved by adding compounds which have at least one free thiol group, molecular weight control simultaneously being maintained. The compound having at least one free thiol group is used in an amount such that the molar ratio of compound having a free thiol group to stable free radical is from 0.05 to 1.1, preferably from 0.05 to 0.8, in particular from 0.1 to 0.7. At an amount below said range, no significant effect which increases the polymerization rate is observed. At an amount above said range no further rate increase occurs, and polymers having undesirably low molecular weights are obtained.

The polymers prepared by the novel process generally have a polydispersity index of from 1.1 to 5, preferably from 1.2 to 3.5, in particular from 1.3 to 2.5.

For carrying out the novel process, a reaction mixture which contains a stable free radical or a source of a stable free radical, at least one ethylenically unsaturated monomer and a compound having at least one free thiol group and, if required, a free radical initiator and, if required, solvents and/or conventional polymerization assistants is expediently heated to a high reaction temperature, for example from 40 to 200° C., in particular from 60 to 150° C. After reaction and cooling are complete, the polymer can be isolated and, if required, washed and dried. If the free radical formers described in more detail below are used as a source of the stable free radicals, the addition of a separate free radical initiator is superfluous. Alternatively, the free radical polymerization can also be thermally initiated in the absence of free radical initiators, in particular when vinylaromatic monomers, such as styrene, are used. Of course, mixtures of ethylenically unsaturated monomers may also be used.

The process is also suitable for the preparation of block copolymers. For this purpose, at least one second ethylenically unsaturated monomer is subjected to a free radical polymerization in the presence of the polymer obtained above. In a suitable procedure, the second ethylenically unsaturated monomer, which as a rule is different from the first ethylenically unsaturated monomer, is added to the polymer, which may have been isolated, if required with addition of fresh amounts of free radical initiator and free stable radicals, and the mixture is heated for polymerization. After cooling, a block copolymer is isolated and, if required, is washed and dried. Here, a second ethylenically unsaturated monomer is also to be understood as meaning a monomer mixture which is different from the first ethylenically unsaturated monomer with respect to the constitutive monomers or composition.

In order to obtain higher block copolymers, a third monomer may be added after polymerization of the second monomer and the polymerization may be carried out in the same manner. The isolation of the polymers formed as intermediates is advisable when a very high purity, well defined block limits and/or high homogeneity within the blocks are desired.

Suitable free radical initiators for the polymerization are in principle all compounds which are capable of initiating a free radical polymerization. Suitable free radical initiators are, for example, peroxides, hydroperoxides, peroxodisulfates, percarbonates, peroxoesters, hydrogen peroxide and azo compounds. Examples of initiators are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumyl hydroperoxide, tert-butyl perneodecanoate, tert-amyl perpivalate, tert-butyl perpivalate, tert-butyl perneohexanoate, tert-butyl perbenzoate, lithium, sodium, potassium and ammonium peroxodisulfate, azoisobutyronitrile, 2,2-azobis(2-amidinopropane) dihydrochloride, 2-(carbamoylazo) isobutyronitrile and 4,4-azobis(4-cyanovaleric acid). The free radical initiator may be both oil-soluble and water-soluble and are adapted to the chosen polymerization medium and to the chosen polymerization temperature in a manner known per se.

Suitable monomers polymerizable by the novel process are all those which have at least one ethylenically unsaturated group. The monomers may be used individually or as mixtures of one another. These monomers include olefins, in particular α-olefins, e.g. ethylene and propylene, cycloalkenes, such as cyclohexene or norbornene, vinylaromatic monomers, such as styrene, α-methylstyrene, o-chlorostyrene or vinyltoluenes, 1,1-diphenylethylene and cis- and/or trans-stilbene, it being possible for the phenyl rings to have one or two substituents selected from nitro, hydroxyl, halogen, $C_1$–$C_4$-alkyl, $C_1$–$C_4$-alkoxy, cyano and sulfonate, and vinyl halides and vinylidene halides, such as vinyl chloride or vinylidene chloride, esters of vinyl alcohol and monocarboxylic acids of 1 to 12 carbon atoms, such as vinyl acetate, vinyl propionate, vinyl n-butyrate or vinyl laurate, esters of allyl alcohol with monocarboxylic acids of 1 to 12 carbon atoms, such as allyl acetate, allyl propionate, allyl n-butyrate and allyl laurate, esters of α,β-monoethylenically unsaturated mono- and dicarboxylic acids of, preferably, 3 to 6 carbon atoms, in particular acrylic acid, methacrylic acid, maleic acid, fumaric acid and itaconic acid, with alkanols of in general 1 to 12, preferably 1 to 8, in particular 1 to 4, carbon atoms, especially methyl, ethyl, n-butyl, isobutyl, tert-butyl and 2-ethylhexyl acrylate and methacrylate, dimethyl maleate or n-butyl maleate, nitriles of α,β-monoethylenically unsaturated carboxylic acids, such as acrylonitrile and methacrylonitrile, and conjugated $C_4$- to $C_8$-dienes, such as 1,3-butadiene and isoprene. Furthermore, α,β-monoethylenically unsaturated mono- and dicarboxylic acids of 3 to 6 carbon atoms, their anhydrides and their amides, e.g. acrylic acid, methacrylic acid, maleic acid, fumaric acid and itaconic acid; maleic anhydride; acrylamide and methacrylamide, N-methylacrylamide, N-ethylacrylamide, N-isopropylacrylamide and N,N'-dimethylacrylamide, and furthermore vinylsulfonic acid and its water-soluble salts, and N-vinylpyrrolidone, are suitable. This also applies to those monomers which have a functional group, e.g. an epoxy, hydroxyl, ureido or N-methylol group. Examples of these are glycidyl (meth)acrylate, hydroxyalkyl (meth) acrylates, aminoalkyl (meth)acrylates, N-alkylolamides of α,β-monoethylenically unsaturated carboxylic acids of 3 to 10 carbon atoms and their esters with alkanols of 1 to 4 carbon atoms.

Preferably used monomers are styrene, butadiene, acrylonitrile, n-butyl acrylate, 2-ethylhexyl acrylate, methyl methacrylate, n-butyl methacrylate and tert-butyl methacrylate and mixtures thereof.

Compounds suitable according to the invention and having at least one free thiol group are preferably those of the formula (I)

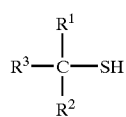

(I)

where $R^1$, $R^2$, and $R^3$, independently of one another, are each hydrogen, alkyl, aryl, aralkyl, cycloalkyl, heterocyclyl or a group -Y-Z, where Y is selected from a single bond, linear or branched alkylene, which may be interrupted by one or more non-neighboring oxygen atoms, or arylene, which is unsubstituted or substituted by $C_1$–$C_4$-alkyl, $C_1$–$C_4$-alkoxy or halogen, and Z is selected from the following functional groups: —$OR^4$, —$NR^4R^5$, —$N+R^4R^5R^6$, —C(O)—$R^4$, C(O)—$NR^4R^5$, —OC(O)—$OR^4$, —OC(O)—$NR^4R^5$, —N($R^6$)—C(O)—$R^4$, —N($R^6$)—C(O)—$OR^4$, —N($R^6$)—C(O)—$NR^4R^5$, —$SR^4$, —S(O)—$R^4$, —S(O)$_2$—$R^4$, —O—S(O)$_2$—$OR^4$, Si($R^7$)$_3$, —O—Si($R^7$)$_3$, —S(O)$_2$—$NR^4R^5$, —P(O)($OR^4$)$_2$, —P(O)($NR^4R^5$)$_2$, —O—P(O)$R^4$($OR^5$), —Si($OR^7$)$_3$, —OSi($OR^7$)$_3$, —CN, —OCN, —SCN, —$NO_2$ or halogen, and, in the case of acidic functional groups, also the alkali metal, alkaline earth metal or ammonium salts and, in the case of basic groups, also the acid addition salts, and where $R^4$, $R^4$, $R^6$ and $R^7$, independently of one another, are each hydrogen, alkyl, aryl, aralkyl, alkylcarbonyl or arylcarbonyl; or $R^1$ and $R^2$, together with the carbon atom to which they are bonded, are a cycloalkyl radical which may have at least one of the abovementioned functional groups -Y-Z, a double bonded oxygen or, if required, oxygen, nitrogen or sulfur as a heteroatom;

or $R^1$ and $R^2$, together with the carbon atom to which they are bonded, are a carbonyl function or an imino function which is unsubstituted or substituted by alkyl, aryl or aralkyl, or $R^1$, $R^2$ and $R^3$, together with the carbon atom to which they are bonded, are an aryl radical which may have at least one of the abovementioned groups -Y-Z, or $R^1$, $R^2$ and $R^3$ together are a heterocyclic radical.

"Alkyl" is preferably $C_1$–$C_{20}$-alkyl; "aryl" is preferably $C_6$–$C_{10}$-aryl, in particular phenyl; "aralkyl" is preferably phenyl-$C_1$–$C_8$-alkyl, in particular benzyl or phenethyl; "cycloalkyl" is preferably $C_3$–$C_8$-cycloalkyl, in particular cyclopentyl and cyclohexyl; "heterocyclyl" is preferably an aromatic radical having a five-membered ring, in which 1, 2, 3 or 4 atoms may be different from carbon and are selected, for example, from O, S and/or N.

Preferably, the compound having at least one free thiol group is selected from alkyl mercaptans, aminoalkane thiols and their mono- and di-N—$C_1$–$C_4$-alkyl derivatives; aromatic aminothiols and their mono- and di-N—$C_1$–$C_4$-alkyl derivatives; aliphatic and aromatic mercaptocarboxylic acids, mercaptodicarboxylic acids and aminomercaptocarboxylic acids, their N-alkyl, N-aryl or N-aralkyl derivatives or their N,N-dialkyl, N,N-diaryl or N,N-bis(aralkyl) derivatives, the esters of said carboxylic acids with aliphatic, aromatic or araliphatic alcohols; aromatic and aliphatic mercapto alcohols and esters of the mercapto alcohols with $C_1$–$C_{10}$-alkanecarboxylic acids, $C_6$–$C_{20}$-arylcarboxylic acids or $C_7$–$C_{20}$-aralkylcarboxylic acids; mercaptodialkyl ketones; mercaptoalkylaryl ketones; mercaptoalkane- and mercaptoarylsulfonic acids and their alkali metal, alkaline earth metal and ammonium salts; thiourea, which is unsubstituted or substituted on one or both nitrogen atoms by alkyl, aryl, aralkyl, alkylcarbonyl or arylcarbonyl; thiosemicarbazide which is unsubstituted or substituted on the amine nitrogen by alkyl, aryl, aralkyl, alkylcarbonyl or arylcarbonyl; mercapto-substituted nitrogen heterocycles, including mercapto-substituted imidazole, imidazoline, thiazole, thiazoline, triazole, thiadiazole and oxazole, which are unsubstituted or substituted by amino, halogen, alkyl or aryl and/or have a fused, unsubstituted or substituted benzene ring; aliphatic and aromatic dicarboxylic acids and their amides, N-alkylamides and N-arylamides; mercaptoalkyltrialkoxysilanes.

The compound having at least one free thiol group is selected in particular from $C_1$–$C_{20}$-alkyl mercaptans, preferably $C_4$–$C_{18}$-alkyl mercaptans, such as butanethiol or tert-dodecyl mercaptan or n-dodecyl mercaptan, 2-aminoethanethiol, N-methyl-, N,N-dimethyl-, N-ethyl- and N,N-diethyl-2-aminoethanethiol, 2-, 3- and 4-aminothiophenol, 2-mercaptoacetic acid, 2-mercaptopropionic acid, 2-mercaptoisobutyric acid, 2-mercaptosuccinic acid, 2-, 3- and 4-mercaptobenzoic acid, 2-amino-3-mercapto-3-methylbutanoic acid, the methyl, ethyl and phenyl esters of said carboxylic acids, 2-hydroxyethanethiol, 2- and 3-hydroxypropanethiol, 2- and 4-hydroxybutanethiol, 2-mercaptobutane-1,4-diol, α-thioglycerol, 2-hydroxycyclopentanethiol, 2- and 4-mercaptophenol, 2-mercaptoethanesulfonic acid, 2- and 3-mercaptopropanesulfonic acid, 2- and 4-mercaptobutanesulfonic acid and the alkali metal, alkaline earth metal or ammonium salts of the said sulfonic acids, 1-mercaptoacetone, phenacylthiol, 4-mercaptoacetophenone, 4-mercaptobenzophenone, thiourea, N-methyl-, N-ethyl-, N-alkyl-, N-acetyl- and N-phenylthiourea, N,N-dimethyl-, N,N-diethyl-, N,N-diisopropyl-, N,N-di-n-butyl- and N,N-diphenylthiourea, thiosemicarbazide, 4-methyl-, 4-ethyl- and 4-phenylthiosemicarbazide, mercaptothiadiazole, 2-amino-5-mercaptothiadiazole, thiazoline-2-thiol, imidazoline-2-thiol, 3-amino-5-mercaptotriazole, 2-mercaptobenzimidazole, 2-mercaptobenzoxazole and 2-mercaptobenzothiazole, thioacetic acid, thiopropionic acid, thiobenzoic acid, thioacetamide, thiobenzamide, 3-mercaptopropyltrimethoxysilane and 3-mercaptopropyltriethoxysilane. Owing to their availability, $C_4$–$C_{18}$-alkyl mercaptans are generally preferred.

Stable free radicals may be added to the reaction mixture as such or may be produced from free radical formers in the reaction mixture. Stable free radicals are usually not capable of initiating a free radical polymerization of monomers. However, these compounds can control the growth of a polymer by reversibly blocking the chain end of said polymer, since in the steady state only a small number of free radical chain ends are present in the reaction mixture, with the result that the probability of irreversible chain termination reactions by combination or disproportionation is reduced. Such stable free radicals which may be used for controlling free radical polymerization are known to a person skilled in the art.

The stable free radical or the source of stable free radical should be present in the reaction mixture in an amount of from $10^{-6}$ to 10, in particular from $10^{-4}$ to 5, mol % based on the molar amount of ethylenically unsaturated monomers.

If the polymerization is initiated by free radical initiators, the molar ratio of stable free radical or of the source of stable free radicals to free radical initiator is chosen in general to be from 0.1 to 10, preferably from 0.5 to 5, in particular from 0.8 to 4.

Particularly suitable stable free radicals are free N-oxyl radicals. They can be described, for example, by the following formula:

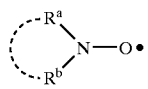

where $R^a$ and $R^b$ are organic radicals which may be linked to one another, the sum of the molecular weights of $R^a$ and $R^b$ being more than 15, preferably more than 28.

Suitable N-oxyl radicals have, for example, the following structures:

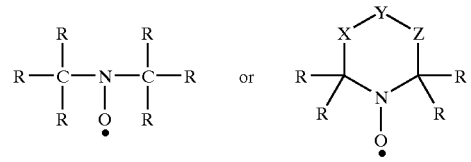

where R are identical or different alkyl, cycloalkyl, aralkyl or aryl radicals of up to 24 carbon atoms, it being possible for geminal R radicals also to be linked in pairs to form a ring system, and X, Y and Z, independently of one another, are each $CR'_2$, CR'OH, CR'(COOH), O, NR, S, $SO_2$, CO or a chemical bond, with the proviso that not more than one radical X, Y or Z is O or S and not more than one radical X, Y or Z is a chemical bond. R' is hydrogen or an alkyl, cycloalkyl, aralkyl or aryl radical of up to 24 carbon atoms. For example, R is $C_1$- to $C_{20}$-alkyl, in particular $C_1$- to $C_8$-alkyl, $C_5$- or C6-cycloalkyl, benzyl or phenyl. X-Y-Z is, for example, —$(CH_2)_2$— or —$(CH_2)_3$—, $CH_2$—CH(OH)—$CH_2$—, —$CH_2$—CO—O— or —$CH_2$—O—.

Furthermore, N-oxyl compounds having aromatic substituents, such as the following structures, are also suitable

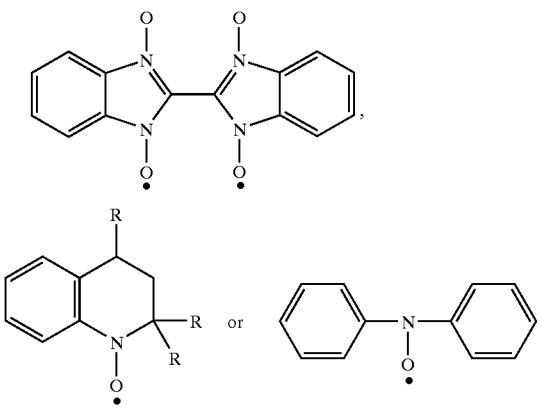

where the aromatic rings in each case may also carry from 1 to 3 inert substituents, e.g. $C_1$- to $C_4$-alkyl, $C_1$- to $C_4$-alkoxy, ester, amide or cyano.

Advantageously used N-oxyl radicals are those which are derived from cyclic amines, for example from piperidine or pyrrolidine compounds which may carry further heteroatoms, such as nitrogen, oxygen or sulfur, in the ring, this heteroatom not being in the neighboring position to the amine nitrogen. The steric hindrance is provided by substituents in both neighboring positions to the amine nitrogen, suitable substituents being hydrocarbon radicals, which replace all 4 hydrogen atoms of the α-$CH_2$ groups. Examples of substituents are phenyl, $C_3$- to $C_6$-cycloalkyl, benzyl and in particular $C_1$- to $C_6$-alkyl, it being possible for the alkyl radicals bonded to the same α-carbon atom also to be bonded to one another to form a 5- or 6-membered ring. Preferably used N-oxyls are sterically hindered amine derivatives of 2,2,6,6-tetraalkylpiperidine.

Preferred N-oxyl compounds are those of the formula (II) or (IIa)

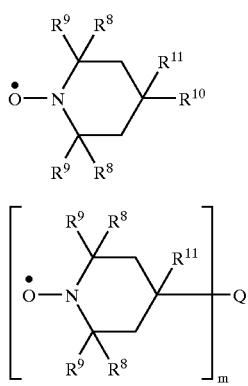

where
R$^8$ and R$^9$, independently of one another, are each C$_1$- to C$_4$-alkyl or phenyl, or R$^8$ and R$^9$ together with the carbon atom to which they are bonded are a 5- or 6-membered, unsubstituted or substituted, saturated hydrocarbon ring which may be bridged by C$_1$- or C$_2$-alkylene or fused with a further 5- or 6-membered hydrocarbon ring and may contain 1 or 2 heteroatoms, selected from O, S and N, and 1 or 2 keto groups, R$^{10}$ is hydrogen, hydroxyl, amino, SO$_3$M, OSO$_3$M, PO$_3$M, OPO$_3$M$_2$, COOM or one of the following radicals

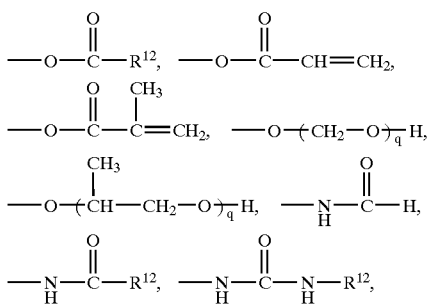

where M is hydrogen or an alkali metal, preferably Li, Na or K,

R$^{11}$ is hydrogen, C$_1$- to C$_4$-alkyl or C$_1$- to C$_4$-alkoxy, or

R$^{10}$ and R$^{11}$ together are oxygen or NOH, or

R$^{10}$ and R$^{11}$, together with the carbon atom to which they are bonded, form a 5- or 6-membered, unsubstituted or substituted, saturated ring which may contain 1 or 2 heteroatoms, selected from O, S and N, and 1 or 2 keto groups, R$^{12}$ is C$_1$- to C$_{12}$-alkyl, C$_2$- to C$_{12}$-alkenyl, C$_6$- to C$_{12}$-aryl or C$_7$- to C$_{14}$-aralkyl, Q is a m-valent organic radical linked via a carbon, oxygen or sulfur and preferably of 2 to 10 000, in particular 4 to 2 000, atoms, m is 2 to 100, preferably 2 or 3, and q is 1 to 10.

R$^8$ and R$^9$ may be C$_1$- to C$_4$-alkyl groups, such as methyl, ethyl, n-propyl, isopropyl, n-butyl, isobutyl, sec-butyl or tert-butyl or together may form a tetra- or pentamethylene group. Preferably, R$^8$ and R$^9$ are each methyl.

Preferred radicals Q are, for example, the following radicals

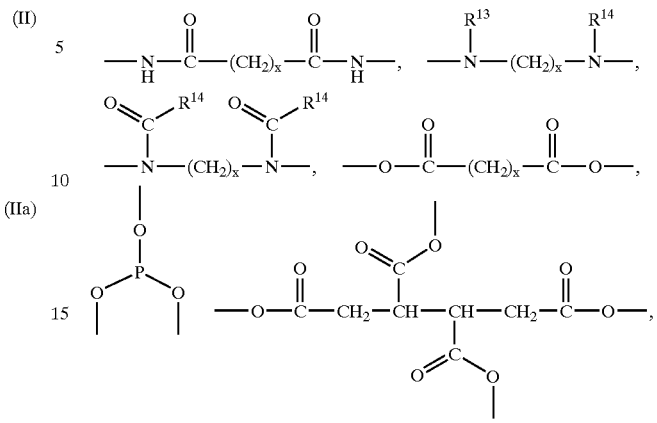

where
R$^{13}$ is C$_1$- to C$_{12}$-alkyl, preferably C$_1$- to C$_4$-alkyl,
R$^{14}$ is hydrogen or C$_1$- to C$_{12}$-alkyl, preferably hydrogen or C$_1$- to C$_4$-alkyl, and
x is 1 to 12.

Further suitable N-oxyls are also oligomeric or polymeric compounds which have a polysiloxane as the polymer main chain and are substituted in the side chain by N-oxyl groups which are derived from 2,2,6,6-tetraalkylpiperidine. A preferably used N-oxyl group is 2,2,6,6-tetramethylpiperidin-N-oxyl. Preferred nitroxyl compounds are the following: 1-oxyl-2,2,6,6-tetramethylpiperidine, 1-oxyl-2,2,6,6-tetramethylpiperidin-4-ol, 1-oxyl-2,2,6,6-tetramethylpiperidin-4-one, 1-oxyl-2,2,6,6-tetramethylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl (4-tert-butyl)benzoate, bis(1-oxyl-2,2,6,6-tetramethylpiperidin-4-yl) succinate, bis(1-oxyl-2,2,6,6-tetramethylpiperidin-4-yl) adipate, bis(1-oxyl-2,2,6,6-tetramethylpiperidin-4-yl) sebacate, bis(1-oxyl-2,2,6,6-tetramethylpiperidin-4-yl) n-butylmalonate, bis(1-oxyl-2,2,6,6-tetramethylpiperidin-4-yl) phthalate, bis(1-oxyl-2,2,6,6-tetramethylpiperidin-4-yl) isophthalate, bis(1-oxyl-2,2,6,6-tetramethylpiperidin-4-yl) terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, N,N'-bis(1-oxyl-2,2,6,6-tetramethylpiperidin-4-yl)-N,N'-bisformyl-1,6-diaminohexane, 4,4'-ethylenebis(1-oxyl-2,2,6,6-tetramethylpiperazin-3-one), tris(2,2,6,6-tetramethyl-1-oxylpiperidin-4-yl) phosphite 4-hydroxy-2,6-diphenyl-2,6-dimethyl-1-oxylpiperidine, 4-carboxy-2,2,6,6-tetramethyl-1-oxylpiperidine, 4-carboxy-2,6-diphenyl-2,6-dimethyl-1-oxylpiperidine, 3-carboxy-2,2,5,5-tetramethyl-1-oxylpyrrolidine, 3-carboxy-2,5-diphenyl-2,5-dimethyl-1-oxylpyrrolidine, the sodium, ammonium or potassium salt of the sulfuric monoester of 4-hydroxy-2,2,6,6-tetramethyl-1-oxylpiperidine, 5,5-dimethyl-3-spirocyclopentylmorphol-2-on-4-oxyl, 5,5-dimethyl-3-spirocyclohexylmorphol-2-on-4-oxyl, 5,5-dimethyl-3-spirocyclopentylmorpholin-4-oxyl, 5,5-dimethyl-3-spirocyclohexylmorpholin-4-oxyl, di-tert-butylnitroxyl, N-tert-butyl-1-diethylphosphono-2,2-dimethylpropylnitroxyl and N-tert-butyl-1-phenyl-2-methylpropylnitroxyl.

Suitable sources of stable free radicals are free radical formers where a stable free radical forms as a fragment as a result of homolytic cleavage, for example by thermolysis, of a chemical bond. A carbon radical which is suitable as a free radical initiator of the polymerization reaction is preferably formed as the other fragment.

Preferred C radicals are the fragments of conventional polymerization initiators, e.g. methyl, ethyl, cyclohexyl, octyl, $C(CN)(CH_3)_2-$, $CHPhCH_3-$ or $CH(CH_3)COOR-$ ($R=C_1-C_4$-alkyl) radicals. For an oligomeric or polymeric chain, the carbon radical may furthermore consist of units of ethylenically unsaturated monomers. The free radical former can be prepared by heating stable free radicals with a polymerization initiator in the presence or absence of a small amount of ethylenically unsaturated monomers.

Emulsifiers or protective colloids may be present. Anionic, nonionic, cationic and amphoteric emulsifiers are suitable. Anionic emulsifiers, for example alkylbenzenesulfonic acid, sulfonated fatty acids, sulfosuccinates, fatty alcohol sulfates, alkylphenol sulfates and fatty alcohol ether sulfates, are preferred. The nonionic emulsifiers used may be, for example, alkylphenol ethoxylates, fatty acid ethoxylates, alkanolamide methoxylates, alkanolamide ethoxylates, EO/PO block copolymers and alkylpolyglucosides. The cationic or amphoteric emulsifiers used are, for example, quaternized aminoalkoxylates, alkylbetaines, alkylamidobetaines and sulfobetaines. Typical protective colloids are, for example, cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinamide, polyvinyl-2-methylsuccinimide, polyvinyl-1,3-oxazolid-2-one and polyvinyl-2-methylimidazoline.

The novel process can be carried out as a solution, mass, suspension, precipitation, emulsion, miniemulsion or microemulsion polymerization, in particular in an aqueous medium. The process can also be carried out as an inverse free radical emulsion polymerization. Suitable solvents for a solution polymerization procedure are, for example, aliphatic or aromatic hydrocarbons, such as cyclohexane, methylcyclohexane, toluene, ethylbenzene or the xylenes. The novel process is carried out in a manner known per se to a person skilled in the art. Solution, mass and miniemulsion polymerization methods are generally preferred.

The reaction temperature is chosen to be from 40 to 200° C., preferably from 60 to 150° C. Suitable reaction times are from 30 minutes to 60 hours.

The examples which follow illustrate the invention.

EXAMPLE 1

The amounts of 2,2,6,6-tetramethylpiperidin-N-oxyl (TEMPO), tert-dodecyl mercaptan (t-DMC) and dibenzoyl peroxide (BPO) stated in the table below were dissolved in 360 g of styrene. 1 000 ml of cyclohexane were added to the mixture and the latter was then heated to 95° C. The sample was kept at this temperature for one hour and then heated to 130° C. The samples were kept at 130° C. for the time stated in the table. Thereafter, the samples were cooled to room temperature, precipitated in an excess of methanol, collected by filtration, washed several times with methanol and dried at 80° C. under reduced pressure. The table shows the conversion, the weight-average molecular weight ($M_w$), the number-average molecular weight ($M_n$) and the polydispersity (PDI) of the polymer obtained.

TABLE

| | TEMPO [g] | BPO [g] | t-DMC [g] | Time [h] | Conversion [%] | $M_n$ [g/mol] | $M_w$ [g/mol] | PDI |
|---|---|---|---|---|---|---|---|---|
| 1 | 0.656 | 0.855 | 0.25 | 4 | 21.8 | 21200 | 28600 | 1.35 |
| | | | | 6 | 28.4 | 25200 | 35900 | 1.43 |
| | | | | 23 | 57.8 | 30900 | 51400 | 1.67 |
| 2 | 0.656 | 0.855 | 0.50 | 4 | 31 | 15700 | 22000 | 1.40 |
| | | | | 6 | 38.6 | 20600 | 30600 | 1.49 |
| | | | | 23 | 64.5 | 23300 | 36800 | 1.58 |
| 3 | 0.656 | 0.855 | 1.00 | 4 | 30.8 | 18400 | 31100 | 1.69 |
| | | | | 6 | 38.6 | 19200 | 34600 | 1.81 |
| | | | | 23 | 64.5 | 21800 | 42500 | 1.95 |
| 4 | 0.656 | 0.855 | 1.70 | 4 | 32.9 | n.d. | n.d. | |
| | | | | 6 | 38.9 | | | |
| 5 | 0.656 | 0.855 | 4.25 | 4 | 31.3 | n.d. | n.d. | |
| | | | | 6 | 41.1 | | | |
| 6 | 0.656 | 0.855 | 0 | 5 | 0 | — | — | — | n.d. = not determined

FIG. 1 shows the conversion in % after 4 hours at 130° C. and after 6 hours at 130° C. as a function of the molar ratio of tert-dodecyl mercaptan to TEMPO. As is evident from FIG. 1, no determinable conversion is observed without addition of tert-dodecyl mercaptan. On addition of tert-dodecyl mercaptan in amounts such that the molar ratio of tert-dodecyl mercaptan to TEMPO is from 0.05 to 1.1, a substantial increase in the polymerization rate is observed. The use of larger amounts of tert-dodecyl mercaptan leads to no further increase in the polymerization rate.

EXAMPLE 2

4-Hydroxy-2,2,6,6-tetramethylpiperidin-N-oxyl (4-OH-TEMPO) (0.82 g) was dissolved in water (350 g). Benzoyl peroxide (75% strength in water; 1.19 g), hexadecane (4.8 g), Lumiten I-RA (bisisooctylsulfosuccinate sodium salt; 50% strength in water; 4.8 g) and tert-dodecyl mercaptan (0.75 g) were added to a mixture of styrene (84.4 g) and n-butyl acrylate (155.7 g). The monomer mixture was added to the aqueous solution of 4-OH-TEMPO and emulsified by means of ultrasonic treatment (5 minutes at a setting of 25% and a further 20 minutes at 100%). After the emulsification, further emulsifier ($Cl_5$-alkanesulfonate sodium salt; 40% strength in water; 12 g) in water (10 g) was added. The emulsion was introduced into a pressure-resistant polymerization vessel, the vessel was closed and the emulsion was heated at 130° C. for 7 hours. Thereafter, the emulsion was cooled, the conversion was determined gravimetrically and the isolated polymer was analyzed by GPC. Conversion 86%; number-average molecular weight 33 000 g/mol, polydispersity 1.9.

COMPARATIVE EXAMPLE 3

Example 2 was repeated, except that the monomer mixture contained no tert-dodecyl mercaptan. Conversion 44%; number-average molecular weight 23 000 g/mol; polydispersity 1.6.

We claim:

1. A process for the preparation of polymers, wherein at least one first ethylenically unsaturated monomer is subjected to a free radical polymerization in the presence of stable free radicals or sources of stable free radicals and of a compound having at least one free thiol group to give a polymer, and wherein the molar ratio of compound having a free thiol group to stable free radicals is from 0.05 to 1.1.

2. A process as claimed in claim 1, wherein at least one second ethylenically unsaturated monomer is subjected to a free radical polymerization in the presence of the polymer of the first ethylenically unsaturated monomer to give a block copolymer.

3. A process as claimed in claim 1, wherein the molar ratio of compound having a free thiol group to stable free radicals is from 0.05 to 0.8.

4. A process as claimed in claim 1, wherein the compound having a free thiol group is selected from compounds of the formula (I)

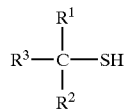

where
$R^1$, $R^2$, and $R^3$, independently of one another, are each hydrogen, alkyl, aryl, aralkyl, cycloalkyl, heterocyclyl or a group -Y-Z, where
Y is selected from a single bond, linear or branched alkylene, which may be interrupted by one or more non-neighboring oxygen atoms, or arylene, which is unsubstituted or substituted by $C_1$–$C_4$-alkyl, $C_1$–$C_4$-alkoxy or halogen, and
Z is selected from the following functional groups:
—$OR^4$, —$NR^4R^5$, —$N+R^4R^5R^6$, —C(O)—$R^4$, C(O)—$NR^4R^5$, —OC(O)—$OR^4$, —OC(O)—$NR^4R^5$, —N($R^6$)—C(O)—$R^4$, —N($R^6$)—C(O)—$OR^4$, —N($R^6$)—C(O)—$NR^4R^5$, —$SR^4$, —S(O)—$R^4$, —S(O)$_2$—$R^4$, —O—S(O)$_2$—$OR^4$, Si($R^7$)$_3$, —O—Si($R^7$)$_3$, —S(O)$_2$—$NR^4R^5$, —P(O)($OR^4$)$_2$, —P(O)($NR^4R^4$)$_2$, —O—P(O)$R^4$($OR^5$), —Si($OR^7$)$_3$, —OSi($OR^7$)$_3$, —CN, —OCN, —SCN, —$NO_2$ or halogen, and, in the case of acidic functional groups, also the alkali metal, alkaline earth metal or ammonium salts and, in the case of basic groups, also the acid addition salts, and where $R^4$, $R^4$, $R^6$ and $R^7$, independently of one another, are each hydrogen, alkyl, aryl, aralkyl, alkylcarbonyl or arylcarbonyl; or
$R^1$ and $R^2$, together with the carbon atom to which they are bonded, are a cycloalkyl radical which may have at least one of the abovementioned functional groups —Y—Z, or a double bonded oxygen;
or $R^1$ and $R^2$, together with the carbon atom to which they are bonded, are a carbonyl function or an imino function which is unsubstituted or substituted by alkyl, aryl or aralkyl, or
$R^1$, $R^2$ and $R^3$, together with the carbon atom to which they are bonded, are an aryl radical which may have at least one of the abovementioned groups -Y-Z, or
$R^1$, $R^2$ and $R^3$ together are a heterocyclic radical.

5. A process as claimed in claim 1, wherein the compound having at least one free thiol group is selected from alkyl mercaptans, aminoalkane mercaptans, aminoalkane-thiols and their mono- and di-N—$C_1$–$C_4$-alkyl derivatives; aromatic aminothiols and their mono- and di-N—$C_1$–$C_4$-alkyl derivatives; aliphatic and aromatic mercaptocarboxylic acids, mercaptodicarboxylic acids and aminomercaptocarboxylic acids, their N-alkyl, N-aryl and N-aralkyl derivatives or their N,N-dialkyl, N,N-diaryl or N,N-bis(aralkyl) derivatives, the esters of said carboxylic acids with aliphatic, aromatic or araliphatic alcohols; aromatic and aliphatic mercapto-alcohols and esters of the mercaptoalcohols with $C_1$–$C_{10}$-alkanecarboxylic acids, $C_6$–$C_{20}$-aralkylcarboxylic acids or $C_7$–$C_{20}$-aralkylcarboxylic acids; mercaptodialkyl ketones; mercaptoalkyl aryl ketones; mercaptoalkyl- and mercaptoaryl-sulfonic acids and their alkali metal, alkaline earth metal and ammonium salts; thiourea which is unsubstituted or substituted on one or both nitrogen atoms by alkyl, aryl, aralkyl, alkylcarbonyl or arylcarbonyl; thiosemicarbazide which is unsubstituted or substituted on the amine nitrogen by alkyl, aryl, aralkyl, alkylcarbonyl or arylcarbonyl; mercapto-substituted nitrogen heterocycles, which are unsubstituted or substituted by amino, halogen, alkyl or aryl and/or have a fused, unsubstituted or substituted benzene ring; aliphatic and aromatic thiocarboxylic acids and their amides, N-alkylamides and N-arylamides; mercaptoalkyl-trialkoxysilanes.

6. A process as claimed in claim 5, wherein the compound having at least one free thiol group is selected from $C_6$–$C_{18}$-alkylmercaptans, 2-aminoethanethiol, N-methyl-, N,N-dimethyl-, N-ethyl- and N,N-diethyl-2-aminoethanethiol, 2-, 3- and 4-aminothiophenol, 2-mercaptoacetic acid, 2-mercaptopropionic acid, 2-mercaptoisobutyric acid, 2-mercaptosuccinic acid, 2-, 3- and 4-mercaptobenzoic acid, 2-amino-3-mercapto-3-methylmethylbutanoic acid, the methyl, ethyl and phenyl esters of said carboxylic acids, 2-hydroxyethanethiol, 2- and 3-hydroxypropanethiol, 2- and 4-hydroxybutanethiol, 2-mercaptobutane-1,4-diol, α-thioglycerol, 2-hydroxycyclopentanethiol, 2- and 4-mercaptophenol, 2-mercaptoethanesulfonic acid, 2- and 3-mercaptopropanesulfonic acid, 2- and 4-mercaptobutanesulfonic acid and the alkali metal, alkaline earth metal or ammonium salts of said sulfonic acids, 1-mercaptoacetone, phenacylthiol, 4-mercaptoacetophenone, 4-mercaptobenzophenone, thiourea, N-methyl-, N-ethyl-, N-alkyl-, N-acetyl- and N-phenylthiourea, N,N'-dimethyl-, N,N'-diethyl-, N,N'-diisopropyl-, N,N'-di-n-butyl- and N,N'-diphenylthiourea, thiosemicarbazide, 4-methyl-, 4-ethyl- and 4-phenylthiosemicarbazide, mercaptothiadiazole, 2-amino-5-mercaptothiadiazole, thiazoline-2-thiol, imidazoline-2-thiol, 3-amino-5-mercaptotriazole, 2-mercaptobenzimidazole, 2-mercaptobenzoxazole, 2-mercaptobenzothiazole, thioacetic acid, thiopropionic acid, thiobenzoic acid, thioacetamide, thiobenzamide, 3-mercaptopropyltrimethoxysilane and 3-mercaptopropyltriethoxysilane.

7. A process as claimed in claim 1, wherein the stable free radical or the source of stable free radicals is used in an amount of from $10^{-6}$ to 10 mol %, based on the molar amount of ethylenically unsaturated monomers.

8. A process as claimed in claim 1, wherein at least one free radical initiator is used for initiating the polymerization and the molar ratio of stable free radicals or source of stable free radicals to free radical initiators is chosen to be from 0.1 to 10.

9. A process as claimed in claim 1, wherein the polymerization temperature is from 40 to 200° C.

10. A process as claimed in claim 1, wherein the stable free radical is an N-oxyl radical and/or the free radical source is the source of an N-oxyl radical.

11. A process as claimed in claim 4, wherein $R^1$ and $R^2$, together with the carbon atom to which they are bonded, are a cycloalkyl radical which may have at least one of the above-mentioned functional groups -Y-Z, a double bonded oxygen or an oxygen, nitrogen or sulfur as a heteroatom.

12. A process as claimed in claim 5, wherein the compound having at least one free thiol group is a mercapto-substituted nitrogen heterocycle selected from the group consisting of mercapto-substituted imidazole, imidazoline, thiazole, thiazoline, triazole, thiadiazole and oxazole.

* * * * *